Dec. 8, 1964  KEIZO YAMAJI  3,160,699
PHOTOGRAPHIC ZOOM OBJECTIVE
Filed Dec. 21, 1960

SPHERICAL ABERRATION

ASTIGMATISM AND DISTORTION

INVENTOR.
KEIZO YAMAJI
BY
ATTORNEY

3,160,699
PHOTOGRAPHIC ZOOM OBJECTIVE
Keizo Yamaji, Tokyo, Japan, assignor to Canon
Camera Co., Inc., a corporation of Japan
Filed Dec. 21, 1960, Ser. No. 77,393
Claims priority, application Japan June 27, 1960
1 Claim. (Cl. 88—57)

This invention relates to an improvement in the type of photographic zoom objective consisting of three components, a positive, a negative and another positive component, arranged in this order from the object side thereof, in which the zooming action is accomplished by moving the second negative component forward and backward.

The essential requisites for high-standard photographic zoom objectives may be summarized as two: first, the variation in residual aberration should be small in amount when zooming takes place, and second, said residual aberration should be as small as that of an ordinary photographic objective. It is especially difficult to satisfy the first requisite. In a photographic zoom objective, for example, of three components of the type mentioned, particularly when a zoom ratio as high as 4:1 and an aperture ratio of over $f/2$ are to be realized while the overall length of the objective is to be as short as possible, that is, the distance between the foremost surface of the objective and the focal plane is to be less than twice its maximum focal length, the effective aperture of the second component comes to be nearly as large as its focal length, and significant spherical aberration will manifest itself in the range of highest magnification end, namely the maximum focal length end, of the zooming range and significantly increase the residual spherical aberration, that is, the variation in aberration is great in zooming.

One of the objects of this invention is to provide a photographic zoom objective of large zooming and aperture ratios, free of such defects as mentioned, eliminating the spherical aberration specific at the highest magnification end of the zooming range without sacrificing the best correction obtained for other aberrations, such as astigmatism, curvature of image field, distortion and chromatic aberration.

Another object of this invention is to provide a photographic zooming objective of large zooming and aperture ratios comprising the three components, a first fixed positive, a second movable negative, and a third, partly, that is, with respect to one of its elements movable, positive component, having at least two elements separated by an air space, the objective having optimum correction of aberrations over the entire zooming range.

Other objects, advantages and features of this invention will become more apparent from the following description of an illustrative embodiment in conjunction with the drawing in which.

Figure 1:
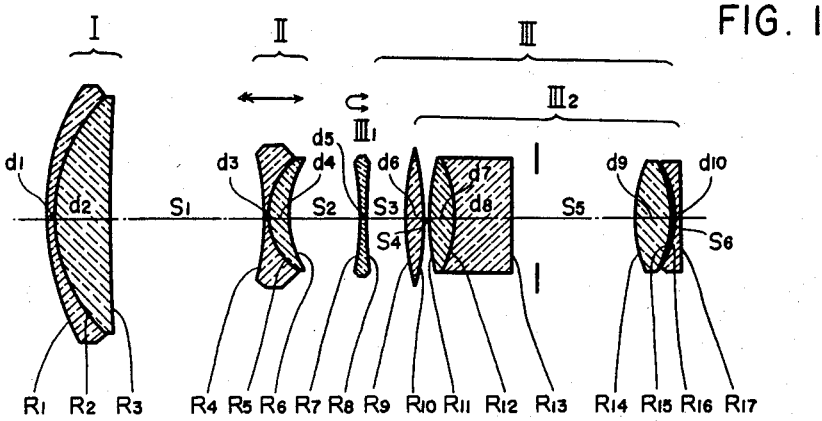
FIG. 1 is a sectional view of a preferred embodiment of this invention.

The improved photographic zoom objective of this invention comprises the three components, namely, in succession from the object side thereof, a positive first (I), a negative second (II) and a positive third component (III), zooming action being accomplished by moving the second compound (II) forward and backward while correction for focal length displacement is obtained by moving the front element (III$_1$) of the third component (III), relative to the second component. The first component (I) consists of a cemented doublet having a negative meniscus and a positive element with their common cemented surface convex to the object, while the second component (II) consists of a cemented doublet having bi-concave and a positive meniscus element with their common cemented surface convex to the object.

The designations used in the following description, including the accompanying figures, denote:

R-subscripts the radii of the curvature of respective surfaces in order from the the object side of the objective;

$f_1$, $f_2$ the focal lengths, respectively, of the first and the second components;

N-subscripts the refractive indices measured at the $d$-line of the spectrum of the respective elements in the same order as mentioned;

V-subscripts the Abbe numbers of the respective elements in said order;

$d$-subscripts the thicknesses of the respective elements on the optical axis, in the same order;

S-subscripts the air spacings, if any, between the component elements thermselves, in the same order; and $\Phi_2$ . . . the effective aperture of the second component.

The following numerical conditions must be satisfied by the photographic zoom objective in accordance with this invention, it being noted that the radius of curvature of an element is positive in sign when the surface is convex to the incident light;

$$0.40f_1 < R_1 < 0.61f_1$$
$$0.25f_1 < R_2 < 0.37f_1$$
$$2.2|f_2| < R_4 < 3.3|f_2|$$
$$0.36|f_2| < R_5 < 0.54|f_2|$$
$$N_1 - 0.12 > N_2 > 1.60$$
$$V_2 - V_1 > 18$$
$$N_4 - 0.10 > N_3 > 1.68$$
$$V_3 - V_4 > 14$$
$$0.7|f_2| < \Phi_2 < |f_2|$$

In the zoom system of the photographic zooming objective embodying this invention, the front element (III$_1$) of the third component (III) is moved repeatedly forward and backward, for correcting the spatial position of the focal point, while the second component (II) is moved for zooming; whereas the follower element of the third component (III$_2$) is fixed for image formation.

As above stated, in the photographic zoom objective embodying this invention, the first component (I) consists of a positive cemented doublet having a front negative meniscus element and the second component (II) of a negative cemented doublet having a rear positive meniscus element. That each of the doublets has a cemented surface highly convex to the front represents a characteristic feature and enables making those doublets remarkably small in thickness, adding very much to preventing the zoom range from being reduced. Besides, it remarkably serves to alleviate the significant spherical aberration specifically appearing at the highest magnification and of the zooming range ratios, that the refractive indices of the elements of the second component (II) are made to lie within the range $N_4 - 0.10 > N_3 > 1.68$, the radii of curvature, of the front negative element, lie within the range $$2.2|f_2| < |R_4| < |3.3|f_2|$$

and $$0.36|f_2| < R_5 < 0.54|f_2|$$

and, in addition, the surfaces of the front negative element of the first component (I) have radii of curvature which lie within the range $$0.40f_1 < R_1 < 0.61f_1$$

and $$0.25f_1 < R_2 < 0.37f_1$$

Limiting $R_1$ and $R_2$ to the stated ranges is effective in controlling the image curvature at and about the medium magnification position of the zooming range where there is a tendency for negative astigmatism to be introduced and accordingly the image field turns to being too positive. The range of the refractive indices of the first component (I) lying within $N_1 - 0.12 > N_2 > 1.60$ works effective in correcting variation of distortion and astigmatism in zooming. Furthermore the condition $V_2 - V_1 > 18$, $V_3 - V_4 > 14$ works to correct and stabilize the axial or longitudinal and the lateral chromatic aberration.

The following table belongs to the preferred embodiment of this invention shown in FIG. 1. It is expressly noted, however, that some modifications in the numerical values given in the following table will not alter the basic characteristics of the present zoom lens system providing the deviations are within a maximum of ±0.05 from the reciprocal of the given values of each R-subscript, or from the given values of each d-subscript and each S-subscript, and within a maximum of ±5% from each of the values of N-subscript and V-subscript. Such differing values mean simply a dimensional variation but in no event a passing beyond the scope of the invention.

[Composite focal length of the entire system $F=1$ to 4. Aperture ratio 1:1.8. Available image field in diagonal 0.6]

| | | | |
|---|---|---|---|
| $R_1 = 2.477$ | $d_1 = 0.08$ | $N_1 = 1.7618$ | $V_1 = 26.5$ |
| $R_2 = 1.515$ | $d_2 = 0.545$ | $N_2 = 1.6237$ | $V_2 = 47.0$ |
| $R_3 = 26.376$ | $S_1 = 0.01561 \sim 1.51561 \sim 2.26561$ | | |
| $R_4 = -4.014$ | $d_3 = 0.05$ | $N_3 = 1.6968$ | $V_3 = 55.6$ |
| $R_5 = 0.6444$ | $d_4 = 0.218$ | $N_4 = 1.8061$ | $V_4 = 40.7$ |
| $R_6 = 1.2215$ | $S_2 = 2.49315 \sim 0.680222 \sim 0.24315$ | | |
| $R_7 = -6.422$ | $d_5 = 0.08$ | $N_5 = 1.6385$ | $V_5 = 55.5$ |
| $R_8 = 6.422$ | $S_3 = 0.08 \sim 0.39293 \sim 0.08$ | | |
| $R_9 = 3.297$ | $d_6 = 0.20$ | $N_6 = 1.6433$ | $V_6 = 47.8$ |
| $R_{10} = -2.83$ | $S_4 = 0.01$ | | |
| $R_{11} = 1.725$ | $d_7 = 0.25$ | $N_7 = 1.5725$ | $V_7 = 57.5$ |
| $R_{12} = -1.404$ | $d_8 = 0.60$ | $N_8 = 1.7174$ | $V_8 = 29.5$ |
| $R_{13} = \infty$ | $S_5 = 1.20$ | | |
| $R_{14} = 1.368$ | $d_9 = 0.37$ | $N_9 = 1.6074$ | $V_9 = 56.7$ |
| $R_{15} = -1.059$ | $S_6 = 0.01$ | | |
| $R_{16} = -0.988$ | $d_{10} = 0.09$ | $N_{10} = 1.5927$ | $V_{10} = 35.4$ |
| $R_{17} = -50.840$ | | | |

$S_1$, $S_2$ and $S_3$ are variable, their values when $f=1$, 2.2435 and 4, are:

| $f$ | 1 | 2.2435 | 4 |
|---|---|---|---|
| $S_1$ | 0.01561 | 1.51561 | 2.26561 |
| $S_2$ | 2.49315 | 0.680222 | 0.24315 |
| $S_3$ | 0.08 | 0.39293 | 0.08 |

Back focal length=0.7450.
Length from the foremost surface to the focal plane of the objective=7.04.

| $f_1 = 5.10$ | $f_2 = -1.50$ | $\Phi_2 = 1.24$ |
|---|---|---|

Figure 2:
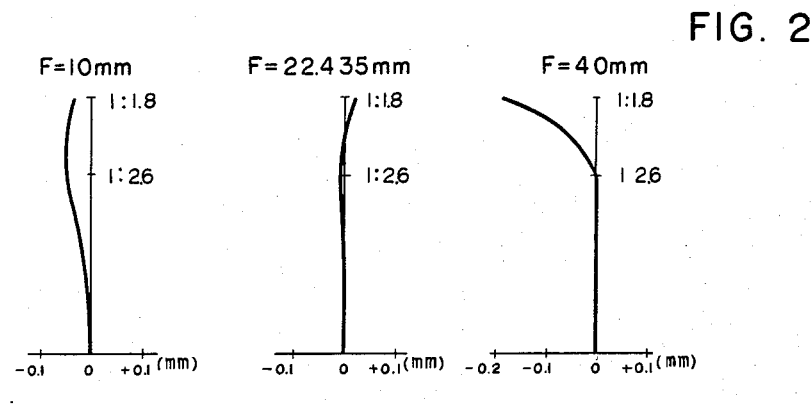
FIG. 2 is a set of curves of spherical aberration for the preferred embodiment of this invention when the focal length of the entire system is at its minimum, medium and maximum values, respectively.
Figure 3:
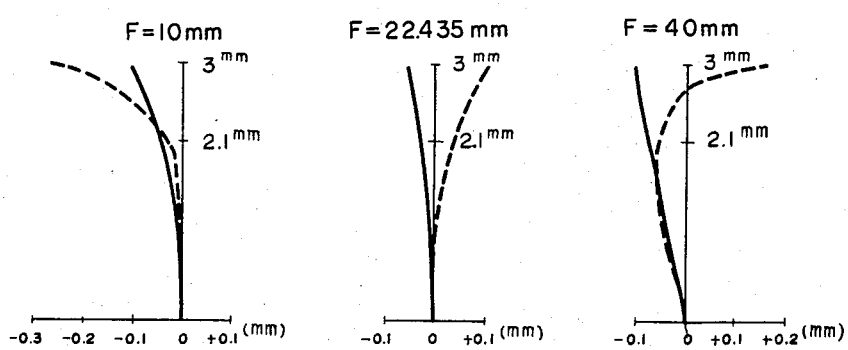
FIG. 3 is a set of curves of astigmatism and distortion of image therefore for the focal lengths in the order mentioned for FIG. 2.

In FIGS. 2 and 3 are shown the curves of spherical aberration, astigmatism and distortion of image when the focal length $f$ is at its minimum value of 10 mm., its medium value of 22,435 mm., and its maximum value of 40 mm., the spherical aberration being shown in full line in FIG. 2, while in FIG. 3 the sagittal field curvature is shown in full line and the meridional aperture curvature in broken line. Prior art objectives comprising three lens components, have values of the zoom ratio of 3:1 and an aperture ratio of F/2.8 at best, while the objective of the present invention, which also consists of three lens components, not only has the high grade value of the zoom ratio of 4:1 and a relative aperture of f/1.8, but also obtains the best correction especially to keep variations in the aberrations, caused by the zoom action, within a narrow range.

It will be understood that this invention is not limited to the specific materials, figures, etc., and other details described above and illustrated in the drawing, but can be carried out with various modifications without departing from the scope of the invention, as defined in the appended claim.

What is claimed is:

A zoom lens system comprising three components, a first positive component of a cemented doublet having a negative meniscus and a positive element with the cemented surface thereof convex to the object, a second negative component of a cemented doublet having a biconcave and a positive meniscus element with the cemented surface thereof convex to the object, and a third positive component comprising a front biconcave negative element and a rear positive main objective, the varifocal action of the lens system being accomplished by moving the second component while compensation for the displacement of the focal plane is obtained by moving the front element of the third component relative to the second component, a rear positive main objective comprising five elements, a first positive element being a single biconvex lens, a second positive element being a biconvex lens cemented to a third negative element, a fourth positive element being a single biconvex lens slightly air spaced with a fifth negative element, in which system substantially the following numerical values obtain:

elements in said order; S-subscripts the air spacings between the elements in said order; and $f_{min}$, $f_m$ and $f_{max}$, the minimum, mean, and maximum composite focal length of the zoom lens portion of the system.

| Lens | Radius of Curvature | Lens Thickness or Air Spacing | Refractive Index | Abbe Number |
|---|---|---|---|---|
| I | $R_1 = 2.477$ | $d_1 = 0.08$ | $N_1 = 1.7618$ | $V_1 = 26.5$ |
|  | $R_2 = 1.515$ | $d_2 = 0.545$ | $N_2 = 1.6237$ | $V_2 = 47.0$ |
|  | $R_3 = 26.376$ | $S_1 \begin{cases} =0.1561 \text{ for } f_{min} \\ =1.51561 \text{ for } f_m \\ =2.26561 \text{ for } f_{max} \end{cases}$ | | |
| II | $R_4 = -4.014$ | $d_3 = 0.05$ | $N_3 = 1.6968$ | $V_3 = 55.6$ |
|  | $R_5 = 0.644$ | $d_4 = 0.218$ | $N_4 = 1.8061$ | $V_4 = 40.7$ |
|  | $R_6 = 1.2215$ | $S_2 \begin{cases} =2.49315 \text{ for } f_{min} \\ =0.68022 \text{ for } f_m \\ =0.24315 \text{ for } f_{max} \end{cases}$ | | |
| $III_1$ | $R_7 = -6.422$ | $d_5 = 0.08$ | $N_5 = 1.6385$ | $V_5 = 55.5$ |
|  | $R_8 = 6.422$ | $S_3 \begin{cases} =0.08 \text{ for } f_{min} \\ =0.39293 \text{ for } f_m \\ =0.08 \text{ for } f_{max} \end{cases}$ | | |
| $III_2$ | $R_9 = 3.297$ | $d_6 = 0.20$ | $N_6 = 1.6433$ | $V_6 = 47.8$ |
|  | $R_{10} = -2.83$ | $S_4 = 0.01$ | | |
|  | $R_{11} = 1.725$ | $d_7 = 0.25$ | $N_7 = 1.5725$ | $V_7 = 57.5$ |
|  | $R_{12} = -1.1404$ | $d_8 = 0.60$ | $N_8 = 1.7174$ | $V_8 = 29.5$ |
|  | $R_{13} = \infty$ | $S_5 = 1.20$ | | |
|  | $R_{14} = 1.368$ | $d_9 = 0.37$ | $N_9 = 1.6074$ | $V_9 = 56.7$ |
|  | $R_{15} = -1.059$ | $S_6 = 0.01$ | | |
|  | $R_{16} = -0.988$ | $d_{10} = 0.09$ | $N_{10} = 1.5927$ | $V_{10} = 35.4$ |
|  | $R_{17} = -50.840$ | | | | where R-subscripts denote the radii of curvature of the respective surfaces from the front to the rear of the lens system in order; N-subscripts the refractive indices measured at the $d$-line of the spectrum of the glasses of the respective elements in said order; V-subscripts the Abbe numbers for the respective elements in said order; $d$-subscripts the axial thicknesses of the respective

References Cited in the file of this patent

UNITED STATES PATENTS 2,741,155    Hopkins    Apr. 10, 1956
2,847,907    Angenieux    Aug. 19, 1958
2,937,572    Yamaji    May 24, 1960
3,038,378    Harris et al.    June 12, 1962